(12) United States Patent
Sun et al.

(10) Patent No.: US 11,142,850 B2
(45) Date of Patent: Oct. 12, 2021

(54) EASY-TO-DYE POROUS MODIFIED POLYESTER FIBER AND PREPARING METHOD THEREOF

(71) Applicant: JIANGSU HENGLI CHEMICAL FIBRE CO., LTD., Wujiang (CN)

(72) Inventors: Xiaohua Sun, Wujiang (CN); Aiqi Kang, Wujiang (CN); Lili Wang, Wujiang (CN)

(73) Assignee: JIANGSU HENGLI CHEMICAL FIBRE CO., LTD., Wujiang (CN)

( * ) Notice: Subject to any disclaimer, the term of this patent is extended or adjusted under 35 U.S.C. 154(b) by 0 days.

(21) Appl. No.: 17/257,322

(22) PCT Filed: Oct. 29, 2019

(86) PCT No.: PCT/CN2019/113852
§ 371 (c)(1),
(2) Date: Dec. 31, 2020

(87) PCT Pub. No.: WO2020/134497
PCT Pub. Date: Jul. 2, 2020

(65) Prior Publication Data
US 2021/0246577 A1  Aug. 12, 2021

(30) Foreign Application Priority Data
Dec. 27, 2018 (CN) .............................. 201811614008

(51) Int. Cl.
*C07C 31/26* (2006.01)
*C08G 63/183* (2006.01)
*C08G 63/80* (2006.01)
*C08G 77/445* (2006.01)
*C08K 5/521* (2006.01)
*C08K 5/524* (2006.01)
*C08L 67/02* (2006.01)
(Continued)

(52) U.S. Cl.
CPC .............. *D01F 6/62* (2013.01); *C01G 30/004* (2013.01); *C01G 30/005* (2013.01); *C08K 3/2279* (2013.01); *D01D 5/088* (2013.01); *D01D 5/16* (2013.01); *D01D 5/247* (2013.01); *D01F 1/10* (2013.01); *D01F 6/92* (2013.01); *D02J 1/228* (2013.01); *C08G 63/695* (2013.01); *C08K 2003/2241* (2013.01); *D10B 2331/04* (2013.01); *D10B 2401/10* (2013.01); *D10B 2401/14* (2013.01)

(58) Field of Classification Search
CPC .... C01G 30/004; C01G 30/005; C07C 31/26; C08G 63/183; C08G 63/695; C08G 63/80; C08G 77/445; C08K 2003/2241; C08K 3/2279; C08K 5/521; C08K 5/524; C08L 67/02; D01D 5/08; D01D 5/088; D01D 5/12; D01D 5/16; D01D 7/00; D01D 10/02; D01F 1/07; D01F 1/10; D01F 6/62; D02J 1/22; D02J 1/228; D02J 13/00

USPC ............ 264/154, 210.3, 210.4, 210.5, 210.6, 264/210.7, 210.8, 211.12, 211.14, 331.21; 423/87, 617; 428/364; 524/140, 141, 524/147, 409, 556, 710, 878; 525/418, 525/446; 528/308.1, 308.2, 308.3; 568/852
See application file for complete search history.

(56) References Cited

U.S. PATENT DOCUMENTS 4,054,025 A * 10/1977 Kubitzek ............... D02G 1/168
57/243
4,699,627 A * 10/1987 Bailey .................... D06P 1/228
8/581
(Continued)

FOREIGN PATENT DOCUMENTS

CN         1119836 A    4/1996
CN       101139435 A    3/2008
(Continued)

OTHER PUBLICATIONS

Translation of CN 109722729 A (published on May 7, 2019).*
Zhiqian Yang, Study on the Pet Fiber Modified by Silicon Compound, Master Dissertation, 2006.

*Primary Examiner* — Leo B Tentoni
(74) *Attorney, Agent, or Firm* — Bayramoglu Law Offices LLC

(57) ABSTRACT

A type of easy-to-dye porous modified polyester fibers and preparing method thereof are disclosed. The preparing method is using the modified polyester melt through a porous spinneret with FDY process; wherein the modified polyester is a product of an esterification and successive polycondensation reactions of an evenly mixed terephthalic acid, ethylene glycol, main chain silicated diol, 2,2,3,4,5,5-hexamethyl-3,4-hexanediol, and metal oxide doped $Sb_2O_3$ powder; wherein the main chain silicated diol is selected from the group consisting of dimethylsiloxane diol, dimethyldiphenyldisiloxane glycol and tetramethyldisiloxane diol. The structural formula of 2,2,3,4,5,5-hexamethyl-3,4-hexanediol is as follows:

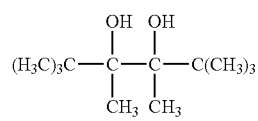

The dye uptake and the K/S value of the prepared easy-to-dye porous modified polyester fiber are high. This invention features a method with ease of application and a product with good dyeing performance and good quality.

17 Claims, No Drawings

(51) Int. Cl.
*D01D 7/00* (2006.01)
*D01D 10/02* (2006.01)
*D01F 1/07* (2006.01)
*D02J 1/22* (2006.01)
*D02J 13/00* (2006.01)
*D01F 6/62* (2006.01)
*D01D 5/088* (2006.01)
*D01D 5/16* (2006.01)
*D01D 5/247* (2006.01)
*D01F 1/10* (2006.01)
*D01F 6/92* (2006.01)
*C01G 30/00* (2006.01)
*C08K 3/22* (2006.01)
*C08G 63/695* (2006.01)

(56) References Cited

U.S. PATENT DOCUMENTS

| | | | | |
|---|---|---|---|---|
| 4,835,956 A | * | 6/1989 | Sasaki | D02G 1/165 28/220 |
| 4,894,427 A | * | 1/1990 | Yamamoto | C08G 77/445 525/446 |
| 4,929,698 A | * | 5/1990 | Hagewood | D01F 6/62 264/211.12 X |
| 5,421,377 A | * | 6/1995 | Bonigk | D03D 15/00 139/426 R |
| 5,607,765 A | * | 3/1997 | Hansen | C08G 63/82 428/364 |
| 5,695,375 A | * | 12/1997 | Takemura | D01F 2/10 428/372 |
| 2002/0037411 A1 | * | 3/2002 | Frankfort | D01F 6/62 264/210.8 X |

FOREIGN PATENT DOCUMENTS

| | | | | |
|---|---|---|---|---|
| CN | 106283253 A | | 1/2017 | |
| CN | 106367935 A | | 2/2017 | |
| CN | 108385186 A | | 8/2018 | |
| CN | 109722729 A | * | 5/2019 | ........... C08G 63/183 |
| CN | 109735926 A | | 5/2019 | |
| KR | 20060076625 A | | 7/2006 | |

* cited by examiner

EASY-TO-DYE POROUS MODIFIED POLYESTER FIBER AND PREPARING METHOD THEREOF

CROSS REFERENCE TO THE RELATED APPLICATIONS

This application is the national phase entry of International Application No. PCT/CN2019/113852, filed on Oct. 29, 2019, which is based upon and claims priority to Chinese Patent Application No. 201811614008.1, filed on Dec. 27, 2018, the entire contents of which are incorporated herein by reference.

TECHNICAL FIELD

The present invention belongs to the field of modified polyester fiber, and more particularly, relates to one type of easy-to-dye porous modified polyester fibers and preparing method thereof.

BACKGROUND

Polyethylene terephthalate (PET fiber or polyester fiber) fiber has high breaking strength and elastic modulus, moderate elasticity and excellent heat setting since it is invented. Heat resistance and light resistance, acid resistance, alkali resistance and corrosion resistance are a series of excellent properties, and the fabric has the advantages of crease resistance, ironing resistance, good fastness and so on. It is widely applied in clothing, home textile and other fields.

The porous polyester fiber is a very promising fiber, widely applied in various fields, which processes the product with a good feel, strong three-dimensional effect and special style, especially suitable for high-performance textiles such as tennis clothing, stockings or medical bandages.

However, because of the high crystallinity, dense structure and no functional groups on the molecular chain, the dye molecules are difficult to enter into the fiber. The difficulty of dyeing makes the existing porous PET fiber cannot meet the fabric demand for bright, beautiful and unique style. The reason for the difficulty of PET dyeing is that PET belongs to symmetrical straight chain macromolecules, the molecular chain does not contain side chain groups, and the regularity is very good. Its main chain contains rigid benzene ring and flexible hydrocarbon group. The ester group and benzene ring directly connected with the benzene ring form a rigid conjugate system, which restricts the free rotation of the flexible segment. This structure increases the wall and ridge of molecular chain motion, which leads to the higher glass transition temperature of PET. It is necessary to promote the diffusion of dye molecules to the fiber at very high temperature, and complete the dyeing process. Therefore, the normal dyeing of PET fibers under high temperature and high pressure, the choice of disperse dyes dyeing, when the temperature of PET fiber to get glass transition temperature, PET fiber polymer molecule void increased, but its free volume increase is small. The dyeing rate is not high, but the high energy consumption and the low dye uptake rate caused by the high temperature and high pressure method are the main problems now. In addition, the PET fiber is relatively high, which is not conducive to processing.

In addition, at this stage, the common antimony catalyst such as $Sb_2O_3$ added frequently in the polyester synthesis process is in a large amount. The large addition of the antimony catalyst has adverse effects on the environment and is not conducive to the environmentally friendly production of polyester. At the same time, the antimony catalyst will be converted into antimony element in the polycondensation reaction, which will make the polyester gray and reduce the brightness. The more the antimony catalyst is added, the greater the color and quality of the polyester will be affected, while too little antimony catalyst cannot catalyze all materials involved in the polyester synthesis process, and cannot meet the demand for polyester production.

Therefore, it is of great significance to develop one type of easy-to-dye porous modified polyester fiber with good dyeing performance and quality.

SUMMARY

The primary object of the present invention is to provide one type of easy-to-dye porous modified polyester fiber with excellent dyeing performance and good quality as well as preparing method thereof, so as to overcome the wherein said inadequacies from the prior art.

To this end, the key technical points of the invention are as follows.

The preparing method of an easy-to-dye porous modified polyester fiber is using the modified polyester melt through a porous spinneret with FDY process;

wherein the porous spinneret has more than 100 holes; wherein the modified polyester is a product of an esterification and successive polycondensation reactions of an evenly mixed terephthalic acid, ethylene glycol, main chain silicated diol, 2,2,3,4,5,5-hexamethyl-3,4-hexanediol, and doped $Sb_2O_3$ powder;

wherein the main chain silicated diol is selected from the group consisting of dimethylsiloxane diol, dimethyldiphenyldisiloxane glycol and tetramethyldisiloxane diol.

In the present invention, the significant improvement of the modified polyester in the free volume of the void is carried out by introducing main chain silicated diol. Disperse dyes are some small molecules without water-soluble groups, and mostly exist in the form of particles with a size ranged from several hundred nanometers to one micron. During the dyeing process of herein said modified polyester, the segments containing —Si—O—Si— bond will move prior to those just containing carbon oxygen bond with the increasing temperature because the silicon oxygen bond has a longer bond length and a lower internal rotation activation energy. When the temperature of dyeing bath reaches 120-130° C., the silicon oxygen bonded molecular chains can form larger free volume of the void owing to their active molecular movement beyond those carbon oxygen bonded ones. Therefore, the diffusion of dye particles into the polyester fiber and the penetration of dye molecules into the polyester macromolecule will be enhanced significantly, which can reduce the dyeing temperature, shorten the dyeing time, reduce the energy consumption, and make the porous modified polyester fiber easy to dye.

The structural formula of 2,2,3,4,5,5-hexamethyl-3,4-hexanediol is as follows:

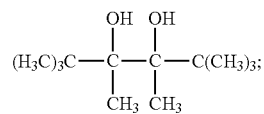

The present invention modifies the polyester with 2,2,3, 4,5,5-hexamethyl-3,4-hexanediol, which can significantly increase the free volume of polyester, especially that the presence of tert-butyl in 2,2,3,4,5,5-hexamethyl-3,4-hexanediol changes activity of the main chain, thereby changing the interaction force and the distance between the molecular chain units, increasing the free volume of the void of the modified polyester; at the same time, because the free volume of the void is larger than the free volume of the slit, and has a larger effective space dimensions, which is more conducive to the penetration of cationic dyes into the fiber. Therefore, the increase in the free volume of the void can significantly reduce the difficulty of dye molecules penetrating into the modified polyester, improve dyeing performance (dye uptake) of the polyester, reduce dyeing temperature, shorten dyeing time and reduce energy consumption.

The doped $Sb_2O_3$ is obtained through a process of evenly mixing an aqueous solution containing metal ions $M^{x+}$ and a solution containing $Sb^{3+}$, then adding in a precipitation to the mixed solution until a pH value of the mixed solution becomes 9-10, and finally calcining and crushing a precipitated product; wherein the metal ions $M^{x+}$ is more than one of $Mg^{2+}$, $Ca^{2+}$, $Ba^{2+}$ and $Zn^{2+}$.

The present invention dopes and blends a metal oxide with a certain catalytic activity and antimony trioxide by evenly mixing an aqueous solution containing metal ions $M^{x+}$ and a solution containing $Sb^{3+}$, then precipitating and calcining; wherein the metal oxide is more than one of MgO, CaO, BaO and ZnO. After doping the said metal oxide and antimony trioxide, the metal oxide inhibits the crystallization of antimony trioxide, and the growth of cubic crystal antimony trioxide grains, and isomorphism replaces antimony and enters the lattice site of antimony, causing defects in the antimony trioxide crystal, changing the crystal morphology, reducing the crystal grain size, and increasing the specific surface area $S_g$ of the antimony trioxide catalyst, while also enriching the metal on the surface of part of the antimony trioxide crystals and increasing the unit surface area activity $r_s$ of the antimony trioxide. The larger the specific surface area $S_g$ and the unit surface area activity $r_s$ are, the higher the activity of the catalyst is. Therefore, the present invention makes the catalytic synthesis of polyester under the low $Sb_2O_3$ addition, which is beneficial to environmentally friendly production and guarantees the quality of synthetic polyester.

The following preferred technology program is presented to give a detailed description for the preparing method of an easy-to-dye porous modified polyester fiber:

wherein the synthesis of 2,2,3,4,5,5-hexamethyl-3,4-hexanediol is the product of cooling, crystallization and refining of evenly mixed palladium acetate and di-tert-butyl dimethyl ethylene, adding a 10-15% mass concentration of hydrogen peroxide solution and reacting at 70-75° C. for 3-4 h, wherein the mass ratio of di-tert-butyl dimethyl ethylene, hydrogen peroxide solution and palladium acetate is 1:1.5-2.0:0.015.

wherein the metal ion $M^{x+}$ solution is an aqueous one with a concentration of 0.5-1.0 mol %, in which the anion is $NO_3^-$; wherein the $Sb^{3+}$ solution is a product of dissolving 5-10 mol % of $Sb_2O_3$ in oxalic acid; wherein the precipitant is ammonia water with a concentration of 2 mol/L; wherein the evenly mixed solution has a 1-3:100 of molar ratio of metal ion $M^{x+}$ respective to $Sb^{3+}$ before precipitation; $Sb_2O_3$ is currently the most cost-effective polyester catalyst. The present invention inhibits the crystallization of antimony trioxide ($Sb_2O_3$) and the growth of cubic antimony trioxide grains by infiltrating metal oxides, while the metal ion $M^{x+}$ will replace antimony and enter the lattice site of antimony, causing defects in the antimony trioxide crystal to improve the catalytic activity of antimony trioxide; if the amount of doped metal oxide is too small (the molar ratio is too low), the effect on the antimony trioxide crystal grain is relatively low; if the amount of doped metal oxide is too large (the molar ratio is too high), it will cause the main body of the catalyst $Sb^{3+}$ to drop significantly, which is not beneficial to improving the catalytic activity of antimony trioxide;

wherein the calcining is preceded by a washing process and a drying process, and the drying process is carried out under a temperature of 105-110° C. for 2-3 h; wherein the calcining comprises steps of heating at 400° C. for 2-3 h, heating at 900° C. for 1-2 h and cooling in air to obtain the doped $Sb_2O_3$; then crushing the doped $Sb_2O_3$ into powder with an average size of less than 0.5 μm.

wherein the preparing method of easy-to-dye porous modified polyester fibers includes a modified polyester manufacturing process composed of following steps:

(1) Esterification concocting terephthalic acid, ethylene glycol, main chain silicated diol and 2,2,3,4,5,5-hexamethyl-3,4-hexanediol into a slurry, and adding in the doped $Sb_2O_3$ powder, the matting agent and the stabilizer, then carrying out the esterification under a nitrogen pressure ranged from atmospheric pressure to 0.3 MPa, while reaction temperature is 250-260° C., finally ending the esterification when a water distillation rate reaches 90% of a theoretical value;

(2) Polycondensation after smoothly reducing the nitrogen pressure from normal value to less than 500 Pa within 30-50 min, conducting a low vacuum polycondensation for the esterification products at 250-260° C. for 30-50 min, then further reducing the pressure to less than 100 Pa and continuing the high vacuum polycondensation at 270-282° C. for 50-90 min.

wherein the molar ratio of the terephthalic acid and the ethylene glycol is 1:1.2-2.0, and a total addition of the main chain silicated diol and the 2,2,3,4,5,5-hexamethyl-3,4-hexanediol is 4-6 mol % of the amount of the terephthalic acid, and a molar ratio of the main chain silicated diol and the 2,2,3,4,5,5-hexamethyl-3,4-hexanediol is 1-2:1-2;

wherein the addition of 2,2,3,4,5,5-hexamethyl-3,4-hexanediol could be adjusted according to the actual application, but the adjustment range should not be too large. If the amount is too large, it will cause too much damage on the regularity of the polyester molecular structure and too much influence on the crystallinity and mechanical properties of the polyester fiber, which is not conducive to the production and application of the fiber; whereas if the amount is too small, the increase in the free volume of the void is not obvious, which has little effect on the dyeing performance of the fiber.

wherein the addition of main chain silicated diol in the preferred range not only ensures the good mechanical property and crystallinity of the modified fiber, but also significantly improves the dyeing performance of the fiber, which is beneficial to the production and application of the fiber. Although the addition of main chain silicated diol could be adjusted according to the actual application, the adjustment range should not be too large. If the amount is too large, it will cause too much damage on the regularity of the polyester molecular structure and too much influence on the crystallinity and mechanical properties of the fiber, which is not conducive to the production and application of the fiber; whereas if the amount is too small, the improvement of the dyeing effect is not obvious.

wherein the additions of the doped $Sb_2O_3$ powder, the matting agent and the stabilizer are 0.012-0.015 wt %, 0.20-0.25 wt % and 0.01-0.05 wt % of the amount of terephthalic acid respectively. In the prior art, the amount of $Sb_2O_3$ added in the polyester synthesis process is usually 0.02-0.04 wt % of the amount of terephthalic acid, which is higher than the amount of the antimony catalyst in the present invention. This is because the unit surface area activity $r_s$ of the undoped $Sb_2O_3$ is lower while the specific surface area $S_g$ of the undoped $Sb_2O_3$ is smaller, the catalytic activity of the undoped $Sb_2O_3$ will be lower. The present invention improves the activity of $Sb_2O_3$ by doping and modifying, thereby significantly reducing the amount of $Sb_2O_3$ added in the polyester synthesis process.

wherein the matting agent is titanium dioxide, and the stabilizer is triphenyl phosphate, trimethyl phosphate or trimethyl phosphite.

wherein the modified polyester has a molecular weight of 25000-30000 Da and a molecular weight distribution index of 1.8-2.2.

wherein the porous spinneret has holes of 144-288; wherein the FDY process comprises steps of metering, spinneret extruding, cooling, oiling, stretching, heat setting and winding;

wherein the technological parameters of the FDY process are chosen as follows: spinning temperature 285-295° C., cooling temperature 17-22° C., interlacing pressure 0.20-0.30 MPa, first godet roller speed 2300-2700 m/min, first godet roller temperature 80-90° C., second godet roller speed 4200-4500 m/min, second godet roller temperature 125-140° C., winding speed 3940-4120 m/min.

wherein the prepared easy-to-dye porous modified polyester fiber contains more than 100 modified polyester FDY in a bunch of filaments;

wherein the modified polyester has a molecular chain structure composed of terephthalic acid segments, ethylene glycol segments, main chain silicated diol segments and 2,2,3,4,5,5-hexamethyl-3,4-hexanediol segments; wherein the modified polyester is also dispersed by doped $Sb_2O_3$ powder.

The following preferred technology program is presented to give a detailed description for the preparing method of an easy-to-dye porous modified polyester fiber:

wherein the easy-to-dye porous modified polyester fiber has the following performance indices: monofilament fineness 0.3-0.5 dtex, breaking strength≥3.5 cN/dtex, elongation at break 30.0±4.0%, interlacing degree 15±3/m, linear density deviation rate≤1.0%, breaking strength CV value≤5.0%, breaking elongation CV value≤9.0%, boiling water shrinkage rate 6.5±0.5%, and 144-288 modified polyester FDY in a bunch of filaments; wherein said modified fiber possesses a performance or quality not lower than that from the prior art, i.e., after modification the polyester fiber still shows good spinnability and mechanical property.

wherein the easy-to-dye porous modified polyester fiber has a dyeing performance as follows: dye uptake is 87.3-92.8% (at 120° C.), K/S value is 22.35-25.43. Comparatively, the dyeing performance indices measured under the same conditions for the contrast sample made of common polyester are listed as follows: dye uptake is 83.7% (at 120° C.), K/S value is 20.36.

Mechanism of the Invention:

The present invention adds main chain silicated diol, 2,2,3,4,5,5-hexamethyl-3,4-hexanediol and doped $Sb_2O_3$ powder during the polyester synthesis process to significantly improve the dyeing performance of polyester on the basis of ensuring the quality of the polyester fiber. The mechanism of this invention could be described as follows.

(1) Doped $Sb_2O_3$ powder:

The doped $Sb_2O_3$ powder of the present invention mainly functions as a catalyst in the polyester synthesis process. The polyester catalysts in the prior art are mainly antimony compounds, such as antimony trioxide, antimony glycol and antimony acetate. The amount of antimony added in the industrial polyester synthesis is more than 200 ppm, although antimony is a heavy metal, with the advancement of the times, restrictions on antimony catalysts are becoming more and more stringent. Sometimes titanium-based catalysis has been used, but it is still unable to replace the antimony catalyst in a short time due to various reasons such as color and activity control.

The catalytic activity of the catalyst is directly proportional to the specific surface area $S_g$ of the catalyst, the internal surface utilization rate f, and the unit surface area activity $r_s$. For a catalyst with a certain composition, its catalytic activity depends on the specific surface area $S_g$ and the internal surface utilization rate f. When the unit surface area activity $r_s$ of the catalyst is constant, the larger the specific surface area is, the higher the catalytic activity is.

The present invention dopes and blends the metal oxide with certain catalytic polycondensation activity and antimony trioxide by blending, precipitating and calcinating the solution. The metal oxide is more than one of MgO, CaO, BaO and ZnO, whose valence and ionic radius have certain differences with antimony. These differences make it possible to change the crystal plane structure of antimony trioxide, thereby affecting related properties. In addition, MgO, CaO, BaO, and ZnO are all white crystals, which will not change the color as a polyester catalyst.

The effects of metal oxides on antimony trioxide are mainly reflected in that: on one hand, the metal oxide inhibits the crystallization of antimony trioxide and the growth of cubic crystal antimony trioxide grains, increasing the specific surface area $S_g$ and the activity of the antimony trioxide catalyst; on the other hand, the metal oxide makes the isomorphism replace antimony and enter the lattice site of antimony, causing defects in the antimony trioxide crystal, changing the crystal morphology, reducing the crystal grain size and increasing the specific surface area $S_g$, while also enriching the metal on the surface of part of the antimony trioxide crystal, increasing the unit surface area activity $r_s$ of the antimony trioxide, and increasing the catalytic activity of the antimony trioxide.

If the metal oxide with certain catalytic polycondensation activity is only physically blended with antimony trioxide, the catalytic activity of antimony trioxide will not be significantly improved, because simple physical blending will not produce crystal defects, and the crystal morphology, the crystal grain size and the total surface area of the crystal will not change, which will not affect the catalytic activity.

The present invention improves the catalytic activity of antimony trioxide to a certain extent by doping antimony trioxide. The increase in the catalytic activity of antimony trioxide is beneficial to reduce the amount of antimony trioxide added in the polyester synthesis process. Under the circumstances that the polycondensation process conditions remain unchanged and the polyester reaches the same index, the amount of antimony trioxide can be reduced by more than 30% after doping with metal oxides, effectively solving the problem that the current addition of antimony trioxide is too much, which ensures the quality and the demand in the polyester production.

(2) The 2,2,3,4,5,5-hexamethyl-3,4-hexanediol segments and the main chain silicated diol segments introduced into the polyester molecular chain:

The macromolecular chains in the polymer are not completely co MPact, between which are gaps called the free volume. In order for small molecules to penetrate into the polymers, there must be enough gaps in or between the polymers, so the permeability and the diffusibility of small molecules are related to the size of gaps in the polymer structure (that is, the size of the free volume). Within a certain range, if the size of the free volume gets larger, the permeability and the diffusibility of small molecules are better. The free volume is divided into the free volume of the void and the free volume of the slit. Compared to the free volume of the slit, the free volume of the void has a larger space size, and a more obvious effect on the improvement of the permeability of small molecules.

The steric hindrance, the size and the structure of the side group, and so on are main factors affecting the structure of the polymer, which is depended by the size and the type of free volume. When a certain position on the main chain of the polymer is substituted by a side group, it will inevitably cause changes in the mobility of the main chain, thereby changing the interaction force between chains, so does the distance between chains. It will lead to changes in cohesive energy and free volume, and has a certain i 1V/Pact on the rigidity of the molecular chain, the interaction between molecules and the free volume fraction of the polymer structure due to the polarity, size and length of the substituents on the side chain of the polymer. Therefore, different substituents have different effects, causing different permeation and separation properties of polymers.

For straight-chain glycol molecules such as ethylene glycol and butylene glycol, the carbon atoms on the main chain are arranged in a zigzag pattern on top of one another. When a hydrogen atom on a methylene group of main chain is replaced by a methyl group (—CH$_3$), the carbon atom on the side group and the carbon atom on the main chain are not in the same plane, so the four sp3 hybrid orbitals on the center carbon atom respectively overlap with the empty orbitals on the surrounding four carbon atoms, forming four identical a bonds, which is arranged in a regular tetrahedron and the four carbon atoms are located at the four vertices of the regular tetrahedron. When the three hydrogens on a methyl group are further replaced by methyl groups, it is equivalent to tert-butyl substitution to form a larger tetrahedral structure. Compared to the molecular chain arranged in a zigzag pattern, the regular tetrahedral molecular chain has a significant increase in the free volume of the void, greatly improving the permeability and diffusibility of small molecules; when a hydrogen atom on a methylene group of main chain is replaced by a long-chain branched substituent, the main increase is in the free volume of the slit and the extent is small, slightly improving the permeability and diffusibility of small molecules, while the low rigidity of the long-chain branched substituent is not conducive to the increase of free volume due to the molecular chains are prone to entanglement.

The structural formula of 2,2,3,4,5,5-hexamethyl-3,4-hexanediol thereof is as follows:

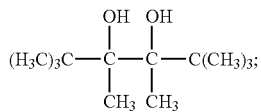

The tert-butyl in 2,2,3,4,5,5-hexamethyl-3,4-hexanediol will cause changes in the mobility of the main chain, thereby changing the interaction force between chains, so does the distance between chains, resulting in an increase in the free volume of the void of the modified polyester. Compared to short-chain branched substituents (such as methyl, ethyl, etc.), tert-butyl occupies a larger space position and will obtain a larger free volume in the molecular chain arrangement; compared to long-chain branched substituents, on the one hand, tert-butyl increases the free volume of the void, while long-chain branched substituents increase the free volume of the slit. On the other hand, the rigidity of tert-butyl is higher than the rigidity of long-chain branched substituents, reducing the entanglement between the molecular chains, so that the tert-butyl has more free volume than the long-chain branched substituents in the molecular chain arrangement.

The main chain silicated diol thereof is dimethylsiloxane glycol, dimethyldiphenyldisiloxane glycol or tetramethyldisiloxane glycol, and their structural formulas are as follows:

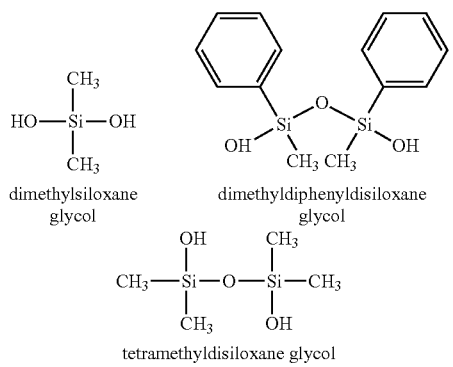

The rigidity of polymer chain depends on the internal rotation potential barrier between the molecular segments, and various chain structures, i.e., unequal bond angles, unequal bond lengths or different bonding modes, will result in diverse molecular rigidities. In the present invention, —Si—O—Si— bonds will formed in main chain of polyester after importing silicated diol. The bond length between silicon atom and oxygen atom is relatively long and the internal rotation activation energy is rather low, which is favorable to the free rotation of atoms. Meanwhile, the silicon atoms in the main chain are bonded with —CH$_3$ which is perpendicular to the plane where —Si—O—Si— lies in, and the steric repulsion between those methyl groups will further enlarge the length of Si—O bond, in addition, the macromolecular chains themselves are also spaced by those inert methyl groups. Therefore, such silicated diol contained polyester has a fairly flexible molecular chain structure and an obviously enlarged free volume compared with unmodified one. However, if a long side chain instead of methyl group is bonded to silicon atom, the limited increases in free volume and the entanglements between those long side chains just bring a less than desirable promotion on the penetration and diffusion of dye molecules.

The increase in free volume of the void is favorable for water or dye molecules to penetrate into the modified polyester, drawing a positive i MPact on the dyeing of polyester fiber such as obtaining higher dye uptake with lower dyeing temperature, shorter dyeing time and less energy consumption.

Benefits:

(1) The method for preparing an easy-to-dye porous modified polyester fiber dopes and modifies antimony trioxide with a metal oxide with certain catalytic polycondensation activity to improves the specific surface area $S_g$ and the unit surface area activity $r_s$ of antimony trioxide, thereby improving the catalytic activity of antimony trioxide and increasing the polymerization efficiency; therefore, it reduces the amount of antimony catalyst added in the polyester synthesis process while meets the demand on the polyester production, which is conducive to the environmentally friendly production by reducing the antimony emission from the subsequent production;

(2) The method for preparing an easy-to-dye porous modified polyester fiber has a simple process. It significantly improves the dyeing performance of polyester fiber by introducing the modified component, that is 2,2,3,4,5,5-hexamethyl-3,4-hexanediol;

(3) The method for preparing an easy-to-dye porous modified polyester fiber modifies the polyester by introducing the main chain silicated diol to reduce the dyeing temperature, shorten the dyeing time, improve the dye uptake rate of the fiber, reduce energy consumption, and increase the spinnability;

(4) The easy-to-dye porous modified polyester fiber of the present invention has excellent dyeing performance, mechanical properties, quality and a promising future.

DETAILED DESCRIPTION OF THE EMBODIMENTS

Based on above mentioned method, the following embodiments are carried out for further demonstration in the present invention. It is to be understood that these embodiments are only intended to illustrate the invention and are not intended to limit the scope of the invention. In addition, it should be understood that after reading the contents described in the present invention, technicians in this field can make various changes or modifications to the invention, and these equivalent forms also fall within the scope of the claims attached to the application.

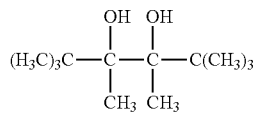

Formula (I)

Example 1

A method for preparing an easy-to-dye porous modified polyester fiber, comprising the steps:

(1) Preparation of modified polyester;

(1.1) Preparation of doped $Sb_2O_3$;

(1.1.1) evenly mixing a 0.8 mol % of $Mg(NO_3)_2$ aqueous solution and a 8 mol % of $Sb_2O_3$ oxalic acid solution, maintaining a 2:100 of molar ratio of $Mg^{2+}$ and $Sb^{3+}$;

(1.1.2) depositing the mixed solution by adding 2 mol/L of ammonia water until pH value reaches 9, then washing and drying (105° C., 2.5 h) the precipitate;

(1.1.3) after the treatment composed of a heating at 400° C. for 2.5 h, a heating at 900° C. for 1.5 h and a cooling in air, crushing the precipitate to obtain the doped $Sb_2O_3$ powder with an average size of 0.4 μm;

(1.2) Synthesis of 2,2,3,4,5,5-hexamethyl-3,4-hexanediol, which is the product of cooling, crystallization and refining of evenly mixed palladium acetate and di-tert-butyl dimethyl ethylene, adding a 10% mass concentration of hydrogen peroxide solution and reacting at 72° C. for 3 h, wherein the mass ratio of di-tert-butyl dimethyl ethylene, hydrogen peroxide solution and palladium acetate is 1:2.0:0.015, and the structural formula of 2,2,3,4,5,5-hexamethyl-3,4-hexanediol is shown in Formula (I);

(1.3) Esterification concocting terephthalic acid, ethylene glycol, dimethylsiloxane diol and 2,2,3,4,5,5-hexamethyl-3,4-hexanediol into a slurry (in which the molar ratio of terephthalic acid and ethylene glycol is 1:1.2, the total addition of dimethylsiloxane diol and 2,2,3,4,5,5-hexamethyl-3,4-hexanediol with a molar ratio of 1:2 is 4 mol % relative to the amount of terephthalic acid), and adding in 0.015 wt % of the doped $Sb_2O_3$ powder, 0.20 wt % of titanium dioxide and 0.03 wt % of triphenyl phosphate (all are relative to the amount of terephthalic acid), then carrying out the esterification under a 0.2 MPa of nitrogen pressure at 260° C., finally ending the reaction when the water distillation rate reaches 95% of the theoretical value;

(1.4) Polycondensation after smoothly reducing the pressure from normal value to 490 Pa within 40 min, conducting the low vacuum polycondensation for the esterification products at 260° C. for 50 min, then further reducing the pressure to 85 Pa and continuing the high vacuum polycondensation at 280° C. for 90 min, finally obtaining the modified polyester with a molecular weight of 30000 Da and a molecular weight distribution index of 2.2;

(2) Spinning through a porous spinneret with FDY process including stages of metering, spinneret extruding (at 285° C.), cooling (at 17° C.), oiling, stretching as well as heat setting (carried on with the parameters of interlacing pressure 0.20 MPa, first godet roller speed 2300 m/min, first godet roller temperature 80° C., second godet roller speed 4000 m/min, second godet roller temperature 125° C.), and winding (3940 m/min).

The prepared easy-to-dye porous modified polyester fiber has the performance indices of monofilament fineness 0.5 dtex, breaking strength 3.8 cN/dtex, elongation at break 34.0%, interlacing degree 18/m, linear density deviation rate 0.8%, breaking strength CV value 4.0%, breaking elongation CV value 7.2%, boiling water shrinkage rate 7.0%, and 288 modified polyester FDY in a bunch of filaments; wherein the easy-to-dye porous modified polyester fiber has a dye uptake rate of 87.3% (at 120° C.), and its K/S value is 22.35.

Comparison 1

A method for preparing a modified polyester FDY involves steps basically the same as those in Example 1, except for 2,2,3,4,5,5-hexamethyl-3,4-hexanediol and dimethylsiloxane diol aren't added in step (1). The prepared modified polyester FDY possess the performance indices of monofilament fineness 0.5 dtex, breaking strength 3.7 cN/dtex, elongation at break 35.0%, interlacing degree 18/m, linear density deviation rate 0.8%, breaking strength CV value 4.1%, breaking elongation CV value 7.2%, boiling water shrinkage rate 7.2%, and 288 modified polyester FDY in a bunch of filaments; under the same conditions as in Example 1, it has a dye uptake rate of 83.7% (at 120° C.), and its K/S value is 20.36.

Comparison 2

A method for preparing a modified polyester FDY involves steps basically the same as those in Example 1, except for 2,2,3,4,5,5-hexamethyl-3,4-hexanediol is not added in step (1). The prepared modified polyester FDY possess the performance indices of monofilament fineness 0.5 dtex, breaking strength 3.7 cN/dtex, elongation at break 36.0%, interlacing degree 18/m, linear density deviation rate 0.9%, breaking strength CV value 4.0%, breaking elongation CV value 7.5%, boiling water shrinkage rate 7.0%, and 288 modified polyester FDY in a bunch of filaments; under the same conditions as in Example 1, it has a dye uptake rate of 85.8% (at 120° C.), and its K/S value is 21.37.

Comparison 3

A method for preparing a modified polyester FDY involves steps basically the same as those in Example 1, except for dimethylsiloxane diol isn't added in step (1). The prepared modified polyester FDY possess the performance indices of monofilament fineness 0.5 dtex, breaking strength 3.7 cN/dtex, elongation at break 37.0%, interlacing degree 18/m, linear density deviation rate 0.9%, breaking strength CV value 4.0%, breaking elongation CV value 7.5%, boiling water shrinkage rate 7.0%, and 288 modified polyester FDY in a bunch of filaments; under the same conditions as in Example 1, it has a dye uptake rate of 85.9% (at 120° C.), and its K/S value is 21.28.

Comparing Example 1 and Comparisons 1-3, it is shown that adding 2,2,3,4,5,5-hexamethyl-3,4-hexanediol and dimethylsiloxane diol significantly improves the dyeing performance of the fiber. When they are synergistic with each other, both of them can increase the void free volume of polyester, so when they are added together, it has a better effect on improving dyeing performance, and little effect on other properties of the fiber, which will not affect its processing and mechanical properties.

Comparison 4

A method for preparing a modified polyester FDY involves steps basically the same as those in Example 1, except for adding dodecane-1,2-diol instead of 2,2,3,4,5,5-hexamethyl-3,4-hexanediol in step (1). The prepared modified polyester FDY possess the performance indices of monofilament fineness 0.5 dtex, breaking strength 3.7 cN/dtex, elongation at break 36.0%, interlacing degree 18/m, linear density deviation rate 0.9%, breaking strength CV value 4.0%, breaking elongation CV value 7.5%, boiling water shrinkage rate 7.0%, and 288 modified polyester FDY in a bunch of filaments; under the same conditions as in Example 1, it has a dye uptake rate of 85.6% (at 120° C.), and its K/S value is 21.52.

Compared with Example 1, it is shown that the tert-butyl in 2,2,3,4,5,5-hexamethyl-3,4-hexanediol is more conducive to improve the dyeing performance of the fiber than the long-chain branched substituent in dodecane-1,2-diol. On one hand, it is because that the tert-butyl in 2,2,3,4,5,5-hexamethyl-3,4-hexanediol increases the free volume of the void, while the long-chain branched substituent in dodecane-1,2-diol increases the free volume of the slit. On the other hand, the rigidity of the tert-butyl in 2,2,3,4,5,5-hexamethyl-3,4-hexanediol is higher than the rigidity of the long-chain branched substituent in dodecane-1,2-diol, reducing the entanglement between the molecular chains, so that 2,2,3,4,5,5-hexamethyl-3,4-hexanediol has more free volume than dodecane-1,2-diol in the molecular chain arrangement, which is more conducive to the dyeing performance of the fiber.

Comparison 5

A method for preparing a modified polyester FDY involves steps basically the same as those in Example 1, except for adding 1,6-hexanediol instead of dimethylsiloxane diol in step (1). The prepared modified polyester FDY possess the performance indices of monofilament fineness 0.5 dtex, breaking strength 3.7 cN/dtex, elongation at break 35.0%, interlacing degree 18/m, linear density deviation rate 0.9%, breaking strength CV value 4.0%, breaking elongation CV value 7.5%, boiling water shrinkage rate 7.0%, and 288 modified polyester FDY in a bunch of filaments; under the same conditions as in Example 1, it has a dye uptake rate of 85.7% (at 120° C.), and its K/S value is 21.44.

Compared with Example 1, it is shown that —Si—O—Si— bonds will formed in main chain of polymer by introducing the main chain silicated diol, so that the silicon-oxygen bond gap is relatively long and the internal rotation activation energy is rather low, which is conducive to the free rotation of atoms, thereby increasing the free volume of the void, improving the dyeing performance of the fiber better than the long-chain branched substituent.

Example 2

A method for preparing an easy-to-dye porous modified polyester fiber, comprising the steps:

(1) Preparation of modified polyester;

(1.1) Preparation of doped $Sb_2O_3$;

(1.1.1) evenly mixing a 0.5 mol % of $Ca(NO_3)_2$ aqueous solution and a 5 mol % of $Sb_2O_3$ oxalic acid solution, maintaining a 1:100 of molar ratio of $Ca^{2+}$ and $Sb^{3+}$;

(1.1.2) depositing the mixed solution by adding 2 mol/L of ammonia water until pH value reaches 10, then washing and drying (110° C., 2 h) the precipitate;

(1.1.3) after the treatment composed of a heating at 400° C. for 2 h, a heating at 900° C. for 1 h and a cooling in air, crushing the precipitate to obtain the doped $Sb_2O_3$ powder with an average size of 0.4 μm;

(1.2) Synthesis of 2,2,3,4,5,5-hexamethyl-3,4-hexanediol, which is the product of cooling, crystallization and refining of evenly mixed palladium acetate and di-tert-butyl dimethyl ethylene, adding a 11% mass concentration of hydrogen peroxide solution and reacting at 70° C. for 4 h, wherein the mass ratio of di-tert-butyl dimethyl ethylene, hydrogen peroxide solution and palladium acetate is 1:1.8:0.015, and the structural formula of 2,2,3,4,5,5-hexamethyl-3,4-hexanediol is shown in Formula (I);

(1.3) Esterification concocting terephthalic acid, ethylene glycol, dimethyldiphenyldisiloxane glycol and 2,2,3,4,5,5-hexamethyl-3,4-hexanediol into a slurry (in which the molar ratio of terephthalic acid and ethylene glycol is 1:1.2, the total addition of dimethyldiphenyldisiloxane glycol and 2,2,3,4,5,5-hexamethyl-3,4-hexanediol with a molar ratio of 2:1 is 6 mol % relative to the amount of terephthalic acid), and adding in 0.012 wt % of the doped $Sb_2O_3$ powder, 0.25 wt % of titanium dioxide and 0.01 wt % of trimethyl phosphate (all are relative to the amount of terephthalic acid), then carrying out the esterification under an atmospheric pressure of nitrogen pressure at 250° C., finally ending the reaction when the water distillation rate reaches 94% of the theoretical value;

(1.4) Polycondensation after smoothly reducing the pressure from normal value to 490 Pa within 30 min, conducting the low vacuum polycondensation for the esterification products at 250° C. for 30 min, then further reducing the pressure to 90 Pa and continuing the high vacuum polycondensation at 270° C. for 50 min, finally obtaining the modified polyester with a molecular weight of 25000 Da and a molecular weight distribution index of 1.8;

(2) Spinning through a porous spinneret with FDY process including stages of metering, spinneret extruding (at 295° C.), cooling (at 22° C.), oiling, stretching as well as heat setting (carried on with the parameters of interlacing pressure 0.30 MPa, first godet roller speed 2700 m/min, first godet roller temperature 90° C., second godet roller speed 4200 m/min, second godet roller temperature 140° C.), and winding (4120 m/min).

The prepared easy-to-dye porous modified polyester fiber has the performance indices of monofilament fineness 0.32 dtex, breaking strength 3.55 cN/dtex, elongation at break 27.0%, interlacing degree 13/m, linear density deviation rate 0.95%, breaking strength CV value 4.8%, breaking elongation CV value 8.8%, boiling water shrinkage rate 6.9%, and 150 modified polyester FDY in a bunch of filaments; wherein the easy-to-dye porous modified polyester fiber has a dye uptake rate of 92.8% (at 120° C.), and its K/S value is 25.43.

Example 3

A method for preparing an easy-to-dye porous modified polyester fiber, comprising the steps:
(1) Preparation of modified polyester;
(1.1) Preparation of doped $Sb_2O_3$;
(1.1.1) evenly mixing a 1.0 mol % of $Ba(NO_3)_2$ aqueous solution and a 10 mol % of $Sb_2O_3$ oxalic acid solution, maintaining a 3:100 of molar ratio of $Ba^{2+}$ and $Sb^{3+}$;
(1.1.2) depositing the mixed solution by adding 2 mol/L of ammonia water until pH value reaches 9.5, then washing and drying (105° C., 3 h) the precipitate;
(1.1.3) after the treatment composed of a heating at 400° C. for 3 h, a heating at 900° C. for 2 h and a cooling in air, crushing the precipitate to obtain the doped $Sb_2O_3$ powder with an average size of 0.5 μm;
(1.2) Synthesis of 2,2,3,4,5,5-hexamethyl-3,4-hexanediol, which is the product of cooling, crystallization and refining of evenly mixed palladium acetate and di-tert-butyl dimethyl ethylene, adding a 12% mass concentration of hydrogen peroxide solution and reacting at 74° C. for 4 h, wherein the mass ratio of di-tert-butyl dimethyl ethylene, hydrogen peroxide solution and palladium acetate is 1:1.6:0.015, and the structural formula of 2,2,3,4,5,5-hexamethyl-3,4-hexanediol is shown in Formula (I);
(1.3) Esterification
concocting terephthalic acid, ethylene glycol, tetramethyldisiloxane diol and 2,2,3,4,5,5-hexamethyl-3,4-hexanediol into a slurry (in which the molar ratio of terephthalic acid and ethylene glycol is 1:2.0, the total addition of tetramethyldisiloxane diol and 2,2,3,4,5,5-hexamethyl-3,4-hexanediol with a molar ratio of 1:1 is 5 mol % relative to the amount of terephthalic acid), and adding in 0.0125 wt % of the doped $Sb_2O_3$ powder, 0.22 wt % of titanium dioxide and 0.05 wt % of trimethyl phosphite (all are relative to the amount of terephthalic acid), then carrying out the esterification under a 0.25 MPa of nitrogen pressure at 255° C., finally ending the reaction when the water distillation rate reaches 97% of the theoretical value;
(1.4) Polycondensation
after smoothly reducing the pressure from normal value to 495 Pa within 50 min, conducting the low vacuum polycondensation for the esterification products at 260° C. for 30 min, then further reducing the pressure to 90 Pa and continuing the high vacuum polycondensation at 270° C. for 50 min, finally obtaining the modified polyester with a molecular weight of 26000 Da and a molecular weight distribution index of 1.9;

(2) Spinning through a porous spinneret with FDY process including stages of metering, spinneret extruding (at 290° C.), cooling (at 20° C.), oiling, stretching as well as heat setting (carried on with the parameters of interlacing pressure 0.25 MPa, first godet roller speed 2500 m/min, first godet roller temperature 85° C., second godet roller speed 4100 m/min, second godet roller temperature 132° C.), and winding (4000 m/min).

The prepared easy-to-dye porous modified polyester fiber has the performance indices of monofilament fineness 0.4 dtex, breaking strength 3.7 cN/dtex, elongation at break 30.0%, interlacing degree 15/m, linear density deviation rate 0.9%, breaking strength CV value 4.5%, breaking elongation CV value 8.0%, boiling water shrinkage rate 6.6%, and 220 modified polyester FDY in a bunch of filaments; wherein the easy-to-dye porous modified polyester fiber has a dye uptake rate of 90.1% (at 120° C.), and its K/S value is 23.90.

Example 4

A method for preparing an easy-to-dye porous modified polyester fiber, comprising the steps:
(1) Preparation of modified polyester;
(1.1) Preparation of doped $Sb_2O_3$;
(1.1.1) evenly mixing a 0.6 mol % of $Zn(NO_3)_2$ aqueous solution and a 6 mol % of $Sb_2O_3$ oxalic acid solution, maintaining a 1.2:100 of molar ratio of $Zn^{2+}$ and $Sb^{3+}$;
(1.1.2) depositing the mixed solution by adding 2 mol/L of ammonia water until pH value reaches 10, then washing and drying (110° C., 2.5 h) the precipitate;
(1.1.3) after the treatment composed of a heating at 400° C. for 2.5 h, a heating at 900° C. for 1 h and a cooling in air, crushing the precipitate to obtain the doped $Sb_2O_3$ powder with an average size of 0.4 μm;
(1.2) Synthesis of 2,2,3,4,5,5-hexamethyl-3,4-hexanediol, which is the product of cooling, crystallization and refining of evenly mixed palladium acetate and di-tert-butyl dimethyl ethylene, adding a 13% mass concentration of hydrogen peroxide solution and reacting at 74° C. for 3.5 h, wherein the mass ratio of di-tert-butyl dimethyl ethylene, hydrogen peroxide solution and palladium acetate is 1:1.5:0.015, and the structural formula of 2,2,3,4,5,5-hexamethyl-3,4-hexanediol is shown in Formula (I);
(1.3) Esterification
concocting terephthalic acid, ethylene glycol, tetramethyldisiloxane diol and 2,2,3,4,5,5-hexamethyl-3,4-hexanediol into a slurry (in which the molar ratio of terephthalic acid and ethylene glycol is 1:1.5, the total addition of tetramethyldisiloxane diol and 2,2,3,4,5,5-hexamethyl-3,4-hexanediol with a molar ratio of 1:1.5 is 6 mol % relative to the amount of terephthalic acid), and adding in 0.013 wt % of the doped $Sb_2O_3$ powder, 0.25 wt % of titanium dioxide and 0.03 wt % of triphenyl phosphate (all are relative to the amount of terephthalic acid), then carrying out the esterification under an atmospheric pressure of nitrogen pressure at 257° C., finally ending the reaction when the water distillation rate reaches 95% of the theoretical value;
(1.4) Polycondensation
after smoothly reducing the pressure from normal value to 495 Pa within 35 min, conducting the low vacuum polycondensation for the esterification products at 255° C. for 35 min, then further reducing the pressure to 90 Pa and continuing the high vacuum polycondensation at 270° C. for 40 min, finally obtaining the modified polyester with a molecular weight of 27000 Da and a molecular weight distribution index of 2.0;

(2) Spinning through a porous spinneret with FDY process including stages of metering, spinneret extruding (at 295° C.), cooling (at 20° C.), oiling, stretching as well as heat setting (carried on with the parameters of interlacing pressure 0.22 MPa, first godet roller speed 2500 m/min, first godet roller temperature 85° C., second godet roller speed 4200 m/min, second godet roller temperature 130° C.), and winding (3940 m/min).

The prepared easy-to-dye porous modified polyester fiber has the performance indices of monofilament fineness 0.3 dtex, breaking strength 3.5 cN/dtex, elongation at break 26.0%, interlacing degree 12/m, linear density deviation rate 1.0%, breaking strength CV value 5.0%, breaking elongation CV value 9.0%, boiling water shrinkage rate 6.0%, and 145 modified polyester FDY in a bunch of filaments; wherein the easy-to-dye porous modified polyester fiber has a dye uptake rate of 92.5% (at 120° C.), and its K/S value is 25.32.

Example 5

A method for preparing an easy-to-dye porous modified polyester fiber, comprising the steps:
(1) Preparation of modified polyester;
(1.1) Preparation of doped $Sb_2O_3$;
(1.1.1) evenly mixing a 0.7 mol % of $Mg(NO_3)_2$ aqueous solution and a 8 mol % of $Sb_2O_3$ oxalic acid solution, maintaining a 2:100 of molar ratio of $Mg^{2+}$ and $Sb^{3+}$;
(1.1.2) depositing the mixed solution by adding 2 mol/L of ammonia water until pH value reaches 10, then washing and drying (110° C., 2.5 h) the precipitate;
(1.1.3) after the treatment composed of a heating at 400° C. for 2.5 h, a heating at 900° C. for 2 h and a cooling in air, crushing the precipitate to obtain the doped $Sb_2O_3$ powder with an average size of 0.5 μm;
(1.2) Synthesis of 2,2,3,4,5,5-hexamethyl-3,4-hexanediol, which is the product of cooling, crystallization and refining of evenly mixed palladium acetate and di-tert-butyl dimethyl ethylene, adding a 14% mass concentration of hydrogen peroxide solution and reacting at 71° C. for 3.5 h, wherein the mass ratio of di-tert-butyl dimethyl ethylene, hydrogen peroxide solution and palladium acetate is 1:1.7:0.015, and the structural formula of 2,2,3,4,5,5-hexamethyl-3,4-hexanediol is shown in Formula (I);
(1.3) Esterification
concocting terephthalic acid, ethylene glycol, dimethylsiloxane diol and 2,2,3,4,5,5-hexamethyl-3,4-hexanediol into a slurry (in which the molar ratio of terephthalic acid and ethylene glycol is 1:1.6, the total addition of dimethylsiloxane diol and 2,2,3,4,5,5-hexamethyl-3,4-hexanediol with a molar ratio of 2:1.5 is 5 mol % relative to the amount of terephthalic acid), and adding in 0.0135 wt % of the doped $Sb_2O_3$ powder, 0.20 wt % of titanium dioxide and 0.035 wt % of triphenyl phosphate (all are relative to the amount of terephthalic acid), then carrying out the esterification under an atmospheric pressure of nitrogen pressure at 257° C., finally ending the reaction when the water distillation rate reaches 94% of the theoretical value;
(1.4) Polycondensation
after smoothly reducing the pressure from normal value to 490 Pa within 40 min, conducting the low vacuum polycondensation for the esterification products at 256° C. for 40 min, then further reducing the pressure to 90 Pa and continuing the high vacuum polycondensation at 275° C. for 90 min, finally obtaining the modified polyester with a molecular weight of 27000 Da and a molecular weight distribution index of 2.0;

(2) Spinning through a porous spinneret with FDY process including stages of metering, spinneret extruding (at 295° C.), cooling (at 22° C.), oiling, stretching as well as heat setting (carried on with the parameters of interlacing pressure 0.20 MPa, first godet roller speed 2700 m/min, first godet roller temperature 80° C., second godet roller speed 4200 m/min, second godet roller temperature 125° C.), and winding (3940 m/min).

The prepared easy-to-dye porous modified polyester fiber has the performance indices of monofilament fineness 0.37 dtex, breaking strength 3.7 cN/dtex, elongation at break 29.0%, interlacing degree 14/m, linear density deviation rate 0.93%, breaking strength CV value 4.6%, breaking elongation CV value 8.3%, boiling water shrinkage rate 6.4%, and 200 modified polyester FDY in a bunch of filaments; wherein the easy-to-dye porous modified polyester fiber has a dye uptake rate of 91.0% (at 120° C.), and its K/S value is 24.63.

Example 6

A method for preparing an easy-to-dye porous modified polyester fiber, comprising the steps:
(1) Preparation of modified polyester;
(1.1) Preparation of doped $Sb_2O_3$;
(1.1.1) mixing a 0.8 mol % of $Mg(NO_3)_2$ aqueous solution and a 0.8 mol % of $Ca(NO_3)_2$ aqueous solution with a volume ratio of 1:1 to obtain an aqueous solution containing metal ions $M^{x+}$, which is evenly mixed with a 8 mol % of $Sb_2O_3$ oxalic acid solution, maintaining a 2.5:100 of molar ratio of $M^{x+}$ and $Sb^{3+}$;
(1.1.2) depositing the mixed solution by adding 2 mol/L of ammonia water until pH value reaches 10, then washing and drying (105° C., 3 h) the precipitate;
(1.1.3) after the treatment composed of a heating at 400° C. for 3 h, a heating at 900° C. for 1.5 h and a cooling in air, crushing the precipitate to obtain the doped $Sb_2O_3$ powder with an average size of 0.4 μm;
(1.2) Synthesis of 2,2,3,4,5,5-hexamethyl-3,4-hexanediol, which is the product of cooling, crystallization and refining of evenly mixed palladium acetate and di-tert-butyl dimethyl ethylene, adding a 15% mass concentration of hydrogen peroxide solution and reacting at 75° C. for 3 h, wherein the mass ratio of di-tert-butyl dimethyl ethylene, hydrogen peroxide solution and palladium acetate is 1:1.9:0.015, and the structural formula of 2,2,3,4,5,5-hexamethyl-3,4-hexanediol is shown in Formula (I);
(1.3) Esterification
concocting terephthalic acid, ethylene glycol, dimethyldiphenyldisiloxane glycol and 2,2,3,4,5,5-hexamethyl-3,4-hexanediol into a slurry (in which the molar ratio of terephthalic acid and ethylene glycol is 1:1.7, the total addition of dimethyldiphenyldisiloxane glycol and 2,2,3,4,5,5-hexamethyl-3,4-hexanediol with a molar ratio of 1.5:1 is 5.5 mol % relative to the amount of terephthalic acid), and adding in 0.014 wt % of the doped $Sb_2O_3$ powder, 0.25 wt % of titanium dioxide and 0.04 wt % of trimethyl phosphate (all are relative to the amount of terephthalic acid), then carrying out the esterification under a 0.2 MPa of nitrogen pressure at 255° C., finally ending the reaction when the water distillation rate reaches 95% of the theoretical value;
(1.4) Polycondensation
after smoothly reducing the pressure from normal value to 490 Pa within 45 min, conducting the low vacuum polycondensation for the esterification products at 254° C. for 45 min, then further reducing the pressure to 90 Pa and continuing the high vacuum polycondensation at 282° C. for 70 min, finally obtaining the modified polyester with a molecular weight of 28500 Da and a molecular weight distribution index of 2.0;

(2) Spinning through a porous spinneret with FDY process including stages of metering, spinneret extruding (at 285° C.), cooling (at 17° C.), oiling, stretching as well as heat setting (carried on with the parameters of interlacing pressure 0.30 MPa, first godet roller speed 2300 m/min, first godet roller temperature 80° C., second godet roller speed 4000 m/min, second godet roller temperature 125° C.), and winding (3940 m/min).

The prepared easy-to-dye porous modified polyester fiber has the performance indices of monofilament fineness 0.33 dtex, breaking strength 3.55 cN/dtex, elongation at break 28.0%, interlacing degree 13/m, linear density deviation rate 0.95%, breaking strength CV value 4.7%, breaking elongation CV value 8.6%, boiling water shrinkage rate 6.6%, and 180 modified polyester FDY in a bunch of filaments; wherein the easy-to-dye porous modified polyester fiber has a dye uptake rate of 91.5% (at 120° C.), and its K/S value is 25.00.

Example 7

A method for preparing an easy-to-dye porous modified polyester fiber, comprising the steps:
(1) Preparation of modified polyester;
(1.1) Preparation of doped $Sb_2O_3$;
(1.1.1) mixing a 0.5 mol % of $Mg(NO_3)_2$ aqueous solution, a 0.5 mol % of $Ba(NO_3)_2$ aqueous solution and a 0.5 mol % of $Ca(NO_3)_2$ aqueous solution with a volume ratio of 1:1:1 to obtain an aqueous solution containing metal ions $M^{x+}$, which is evenly mixed with a 10 mol % of $Sb_2O_3$ oxalic acid solution, maintaining a 2:100 of molar ratio of $M^{x+}$ and $Sb^{3+}$;
(1.1.2) depositing the mixed solution by adding 2 mol/L of ammonia water until pH value reaches 9, then washing and drying (108° C., 2.5 h) the precipitate;
(1.1.3) after the treatment composed of a heating at 400° C. for 2.5 h, a heating at 900° C. for 2 h and a cooling in air, crushing the precipitate to obtain the doped $Sb_2O_3$ powder with an average size of 0.4 μm;
(1.2) Synthesis of 2,2,3,4,5,5-hexamethyl-3,4-hexanediol, which is the product of cooling, crystallization and refining of evenly mixed palladium acetate and di-tert-butyl dimethyl ethylene, adding a 13% mass concentration of hydrogen peroxide solution and reacting at 73° C. for 3.4 h, wherein the mass ratio of di-tert-butyl dimethyl ethylene, hydrogen peroxide solution and palladium acetate is 1:1.8:0.015, and the structural formula of 2,2,3,4,5,5-hexamethyl-3,4-hexanediol is shown in Formula (I);
(1.3) Esterification
concocting terephthalic acid, ethylene glycol, dimethylsiloxane diol and 2,2,3,4,5,5-hexamethyl-3,4-hexanediol into a slurry (in which the molar ratio of terephthalic acid and ethylene glycol is 1:2.0, the total addition of dimethylsiloxane diol and 2,2,3,4,5,5-hexamethyl-3,4-hexanediol with a molar ratio of 1:1 is 6 mol % relative to the amount of terephthalic acid), and adding in 0.014 wt % of the doped $Sb_2O_3$ powder, 0.25 wt % of titanium dioxide and 0.04 wt % of trimethyl phosphate (all are relative to the amount of terephthalic acid), then carrying out the esterification under a 0.3 MPa of nitrogen pressure at 260° C., finally ending the reaction when the water distillation rate reaches 94% of the theoretical value;

(1.4) Polycondensation
after smoothly reducing the pressure from normal value to 495 Pa within 40 min, conducting the low vacuum polycondensation for the esterification products at 260° C. for 50 min, then further reducing the pressure to 90 Pa and continuing the high vacuum polycondensation at 278° C. for 65 min, finally obtaining the modified polyester with a molecular weight of 28200 Da and a molecular weight distribution index of 2.2;

(2) Spinning through a porous spinneret with FDY process including stages of metering, spinneret extruding (at 295° C.), cooling (at 20° C.), oiling, stretching as well as heat setting (carried on with the parameters of interlacing pressure 0.25 MPa, first godet roller speed 2700 m/min, first godet roller temperature 80° C., second godet roller speed 4050 m/min, second godet roller temperature 135° C.), and winding (4120 m/min).

The prepared easy-to-dye porous modified polyester fiber has the performance indices of monofilament fineness 0.32 dtex, breaking strength 3.52 cN/dtex, elongation at break 26.5%, interlacing degree 13/m, linear density deviation rate 0.82%, breaking strength CV value 4.9%, breaking elongation CV value 8.8%, boiling water shrinkage rate 6.2%, and 160 modified polyester FDY in a bunch of filaments; wherein the easy-to-dye porous modified polyester fiber has a dye uptake rate of 92.0% (at 120° C.), and its K/S value is 25.23.

What is claimed is:

1. A preparing method for an easy-to-dye porous modified polyester fiber, comprising manufacturing the easy-to-dye porous modified polyester fiber by melting a modified polyester through a porous spinneret with FDY process;
wherein the porous spinneret has more than 100 holes; the modified polyester is a product of an esterification and successive polycondensation reactions of an evenly mixed mixture of terephthalic acid, ethylene glycol, main chain silicated diol, 2,2,3,4,5,5-hexamethyl-3,4-hexanediol, and doped $Sb_2O_3$ powder;
wherein the main chain silicated diol is selected from the group consisting of dimethylsiloxane diol, dimethyldiphenyldisiloxane glycol and tetramethyldisiloxane diol; and a structural formula of the 2,2,3,4,5,5-hexamethyl-3,4-hexanediol is as follows:

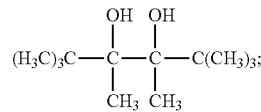

wherein the doped $Sb_2O_3$ powder is obtained through a process of evenly mixing an aqueous solution containing metal ions $M^{x+}$ and a solution containing $Sb^{3+}$ to obtain a mixed solution, then adding in a precipitant to the mixed solution until a pH value of the mixed solution becomes 9-10 to form a precipitate, and finally calcining and crushing the precipitate; wherein the metal ions $M^{x+}$ is one or more selected from the group consisting of $Mg^{2+}$, $Ca^{2+}$, $Ba^{2+}$ and $Zn^{2+}$.

2. The preparing method of claim 1, wherein the 2,2,3,4,5,5-hexamethyl-3,4-hexanediol is a product of a process comprising cooling, crystallization and refining of an evenly mixed mixture of palladium acetate and di-tert-butyl dimethyl ethylene, adding a 10-15% mass concentration of a hydrogen peroxide solution and reacting at 70-75° C. for 3-4 h, wherein a mass ratio of the di-tert-butyl dimethyl ethylene, the hydrogen peroxide solution and the palladium acetate is 1:(1.5-2.0):0.015.

3. The preparing method of claim 2, wherein the aqueous solution containing metal ions $M^{x+}$ is an aqueous one with a concentration of 0.5-1.0 mol %, wherein an anion of the aqueous solution is $NO_3^-$; the solution containing $Sb^{3+}$ is a product of dissolving 5-10 mol % of $Sb_2O_3$ in oxalic acid; the precipitant is ammonia water with a concentration of 2 mol/L; the mixed solution has a 1-3:100 molar ratio of the metal ions $M^{x+}$ and the $Sb^{3+}$ before adding in the precipitant;

wherein after forming the precipitate, the calcining is preceded by a washing process and a drying process, and the drying process is carried out under a temperature of 105-110° C. for 2-3 h; wherein the calcining comprises steps of heating at 400° C. for 2-3 h, heating at 900° C. for 1-2 h and cooling in air to obtain a doped $Sb_2O_3$; then crushing the doped $Sb_2O_3$ into powder with an average size of less than 0.5 μm.

4. The preparing method of claim 3, wherein the modified polyester is manufactured through the following steps:
(1) Esterification
concocting the terephthalic acid, the ethylene glycol, the main chain silicated diol and the 2,2,3,4,5,5-hexamethyl-3,4-hexanediol into a slurry, and adding in the doped $Sb_2O_3$ powder, a matting agent and a stabilizer, then carrying out the esterification under a nitrogen atmosphere with a pressure ranged from an atmospheric pressure to 0.3 MPa, wherein a reaction temperature is 250-260° C., finally ending the esterification when a water distillation rate reaches 90% of a theoretical value;
(2) Polycondensation
after smoothly reducing the pressure of the nitrogen atmosphere from the atmospheric pressure to less than 500 Pa within 30-50 min, conducting a low vacuum polycondensation for products of the esterification at 250-260° C. for 30-50 min, then further reducing the pressure to less than 100 Pa and continuing with a high vacuum polycondensation at 270-282° C. for 50-90 min.

5. The preparing method of claim 4, wherein a molar ratio of the terephthalic acid and the ethylene glycol is 1:(1.2-2.0), and a total addition of the main chain silicated diol and the 2,2,3,4,5,5-hexamethyl-3,4-hexanediol is 4-6 mol % of an amount of the terephthalic acid, and a molar ratio of the main chain silicated diol and the 2,2,3,4,5,5-hexamethyl-3,4-hexanediol is (1-2):(1-2); and an amount of the doped $Sb_2O_3$ powder, the matting agent and the stabilizer is 0.012-0.015 wt %, 0.20-0.25 wt %, and 0.01-0.05 wt % of the amount of the terephthalic acid, respectively.

6. The preparing method of claim 5, wherein the matting agent is titanium dioxide, and wherein the stabilizer is triphenyl phosphate, trimethyl phosphate or trimethyl phosphite.

7. The preparing method of claim 6, wherein the modified polyester has a molecular weight of 25000-30000 Da and a molecular weight distribution index of 1.8-2.2.

8. The preparing method of claim 1, wherein the porous spinneret has 144-288 holes; wherein the FDY process comprises the steps of metering, spinneret extruding, cooling, oiling, stretching, heat setting and winding;
wherein a spinning temperature is 285-295° C., a cooling temperature is 17-22° C., an interlacing pressure is 0.20-0.30 MPa, a first godet roller speed is 2300-2700 m/min, a first godet roller temperature is 80-90° C., a second godet roller speed is 4000-4200 m/min, a second godet roller temperature is 125-140° C., and a winding speed is 3940-4120 m/min.

9. An easy-to-dye porous modified polyester fiber manufactured by the preparing method of claim 1, wherein a bunch of filaments contain more than 100 modified polyester FDY;
wherein the modified polyester has a molecular chain structure composed of terephthalic acid segments, ethylene glycol segments, main chain silicated diol segments and 2,2,3,4,5,5-hexamethyl-3,4-hexanediol segments; wherein the modified polyester is dispersed with the doped $Sb_2O_3$ powder.

10. The easy-to-dye porous modified polyester fiber of claim 9, wherein the easy-to-dye porous modified polyester fiber has mechanical performance indices of monofilament fineness 0.3-0.5 dtex, a breaking strength≥3.5 cN/dtex, an elongation at break 30.0±4.0%, an interlacing degree 15±3/m, a linear density deviation rate≤1.0%, a breaking strength CV value≤5.0%, a breaking elongation CV value≤9.0%, a boiling water shrinkage rate 6.5±0.5%, and 144-288 modified polyester FDY in the bunch of filaments; wherein the easy-to-dye porous modified polyester fiber has a dye uptake rate of 87.3-92.8% (at 120° C.), and a K/S value of 22.35-25.43.

11. The easy-to-dye porous modified polyester fiber of claim 9, wherein the 2,2,3,4,5,5-hexamethyl-3,4-hexanediol is a product of a process comprising cooling, crystallization and refining of an evenly mixed mixture of palladium acetate and di-tert-butyl dimethyl ethylene, adding a 10-15% mass concentration of a hydrogen peroxide solution and reacting at 70-75° C. for 3-4 h, wherein a mass ratio of the di-tert-butyl dimethyl ethylene, the hydrogen peroxide solution and the palladium acetate is 1:(1.5-2.0): 0.015.

12. The easy-to-dye porous modified polyester fiber of claim 11, wherein the aqueous solution containing metal ions $M^{x+}$ is an aqueous one with a concentration of 0.5-1.0 mol %, wherein an anion of the aqueous solution is $NO_3^-$; the solution containing $Sb^{3+}$ is a product of dissolving 5-10 mol % of $Sb_2O_3$ in oxalic acid; the precipitant is ammonia water with a concentration of 2 mol/L; the mixed solution has a 1-3:100 molar ratio of the metal ions M' and the $Sb^{3+}$ before adding in the precipitant;

wherein after forming the precipitate, the calcining is preceded by a washing process and a drying process, and the drying process is carried out under a temperature of 105-110° C. for 2-3 h; wherein the calcining comprises steps of heating at 400° C. for 2-3 h, heating at 900° C. for 1-2 h and cooling in air to obtain a doped $Sb_2O_3$; then crushing the doped $Sb_2O_3$ into powder with an average size of less than 0.5 μm.

13. The easy-to-dye porous modified polyester fiber of claim 12, wherein the modified polyester is manufactured through the following steps:
(1) Esterification
concocting the terephthalic acid, the ethylene glycol, the main chain silicated diol and the 2,2,3,4,5,5-hexamethyl-3,4-hexanediol into a slurry, and adding in the doped $Sb_2O_3$ powder, a matting agent and a stabilizer, then carrying out the esterification under a nitrogen atmosphere with a pressure ranged from an atmospheric pressure to 0.3 MPa, wherein a reaction temperature is 250-260° C., finally ending the esterification when a water distillation rate reaches 90% of a theoretical value;
(2) Polycondensation
after smoothly reducing the pressure of the nitrogen atmosphere from the atmospheric pressure to less than 500 Pa within 30-50 min, conducting a low vacuum polycondensation for products of the esterification at 250-260° C. for 30-50 min, then further reducing the pressure to less than 100 Pa and continuing with a high vacuum polycondensation at 270-282° C. for 50-90 min.

14. The easy-to-dye porous modified polyester fiber of claim 13, wherein a molar ratio of the terephthalic acid and the ethylene glycol is 1:(1.2-2.0), and a total addition of the main chain silicated diol and the 2,2,3,4,5,5-hexamethyl-3,4-hexanediol is 4-6 mol % of an amount of the terephthalic acid, and a molar ratio of the main chain silicated diol and the 2,2,3,4,5,5-hexamethyl-3,4-hexanediol is (1-2):(1-2); and an amount of the doped $Sb_2O_3$ powder, the matting agent and the stabilizer is 0.012-0.015 wt %, 0.20-0.25 wt %, and 0.01-0.05 wt % of the amount of the terephthalic acid, respectively.

15. The easy-to-dye porous modified polyester fiber of claim 14, wherein the matting agent is titanium dioxide, and wherein the stabilizer is triphenyl phosphate, trimethyl phosphate or trimethyl phosphite.

16. The easy-to-dye porous modified polyester fiber of claim 15, wherein the modified polyester has a molecular weight of 25000-30000 Da and a molecular weight distribution index of 1.8-2.2.

17. The easy-to-dye porous modified polyester fiber of claim 9, wherein the porous spinneret has 144-288 holes; wherein the FDY process comprises the steps of metering, spinneret extruding, cooling, oiling, stretching, heat setting and winding;

wherein a spinning temperature is 285-295° C., a cooling temperature is 17-22° C., an interlacing pressure is 0.20-0.30 MPa, a first godet roller speed is 2300-2700 m/min, a first godet roller temperature is 80-90° C., a second godet roller speed is 4000-4200 m/min, a second godet roller temperature is 125-140° C., and a winding speed is 3940-4120 m/min.

* * * * *